March 18, 1930. U. C. PEMBERTON 1,750,783
ARTIFICIAL BAIT
Filed Jan. 16, 1929
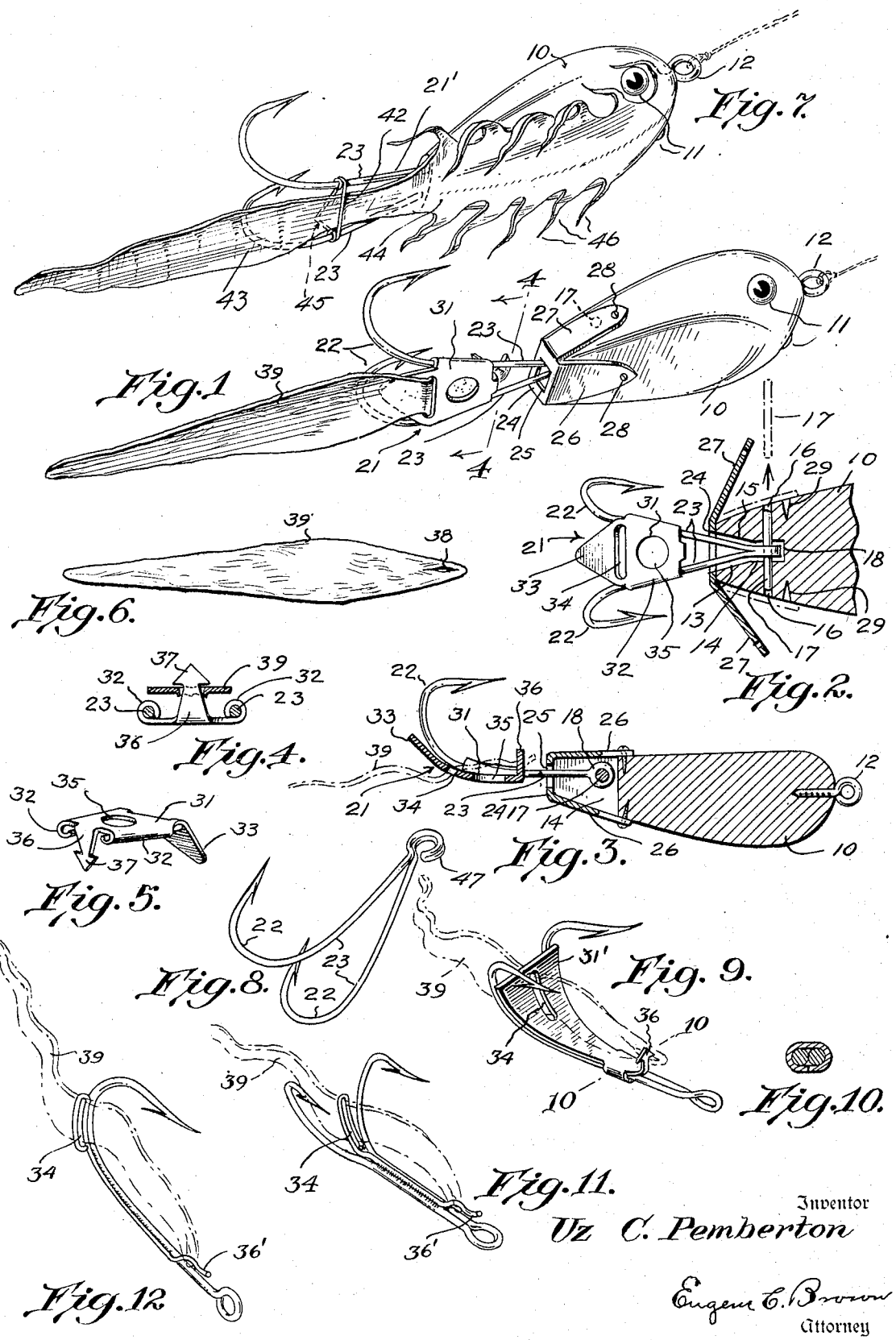
Inventor
Uz C. Pemberton
Eugene C. Brown
Attorney Patented Mar. 18, 1930

1,750,783

UNITED STATES PATENT OFFICE

UZ C. PEMBERTON, OF SEFFNER, FLORIDA

ARTIFICIAL BAIT

Application filed January 16, 1929. Serial No. 332,783.

The present invention relates to an artificial bait and more particularly to an artificial bait or lure adapted to be drawn or towed though the water by a trolling line whereby to lure fish into proximity with suitable hooks forming a part of the bait.

One object of this invention is the provision of an artificial bait which will hold and float a pork rind or other suitable streamer on the surface of the water and will also be practically free from entanglement with weeds.

A further object of the invention is the provision of an artificial bait so constructed as to simulate live bait.

With the above objects in view as well as others that will become apparent from the following description reference will be had to the accompanying drawings in which—

Figure 1 is a perspective view of a preferred embodiment of my invention.

Figure 2 is a horizontal sectional view of the rear end of the construction illustrated in Fig. 1 with certain parts in plan.

Figure 3 is a substantially central longitudinal sectional view of the construction illustrated in Fig. 1.

Figure 4 is a transverse sectional view represented by line 4—4 of Fig. 1.

Figure 5 is a perspective view of the hook bracing and tail supporting means.

Figure 6 is a plan view of the tail piece.

Figure 7 is a perspective view showing a modification of my invention.

Figure 8 is a perspective view of a hook structure disclosing a modified form of attaching eye; and Figs. 9, 11 and 12 are perspective views of different forms of my hook structure provided with guide slots to receive the bait streamer or pork rind, Fig. 10 being a transverse section on the line 10—10 of Fig. 9.

10 designates the body of my improved bait or lure which may be constructed of wood or other light material and which, as indicated in Figs. 2 and 3, is of solid formation and is preferably shaped to simulate the body of live bait such as a fish, frog or the like and is preferably provided with eyes 11. The forward end of body 10 substantially coincident with the central longitudinal center line thereof is provided with an eye member 12 for the attachment of a trolling line. The body 10 is provided at its rear end with a vertically extending slot 13 which opens upwardly, downwardly, and outwardly, the slot being defined by parallel laterally spaced walls 14 and outwardly diverging walls 15, merging with walls 14, adjacent the inner end of slot 13. Formed in body 10 opposite walls 14 of slot 13 are transversely alined bores 16, adapted for the detachable reception of a pin 17, which pin in assembled relation of the device extends loosely through an eye member 18, integral with a hook assembly 21. As indicated in Fig. 2, the eye member rests in recess 13 between parallel walls 14. Hook assembly 21 comprises a pair of hooks 22 embodying outwardly diverging shanks 23, integrally united in the formation of eye member 18 and whose divergence is equal to that of walls 15, as indicated in Fig. 2.

Embracing the rear end of body 10 is a plate 24, provided with a rectangular aperture 25 through which shanks 23 extend and which is of such dimensions as to restrict lateral movement of shanks 23 but to permit limited vertical movement thereof about pin 17. Plate 24 embodies integral tongue members 26 and 27, the former being in substantial alinement when in closed position, closing slot 13 at the upper and lower sides of body 10. The members 27 embrace the sides of body 10 and close the outer ends of bores 16, thus effectually preventing displacement of pin 17. Tongue members 26 and 27 are detachably secured in engagement with body 10 by means of screws 28 extended through apertures adjacent the ends of tongue members 26 and 27 and engaged within body 10 as indicated at 29. Plate 24 further provides a reinforcement adjacent the slotted end of body 10.

Plate 24 is formed from thin sheet metal by stamping operations with tongue members 26 and 27 in the same plane, which are bent down into engagement with body 10 after the passage of shanks 23 through aperture 25 and the insertion of pin 17 in bores 16 and eye member 18 as represented in Fig. 2.

The hook assembly 21 further comprises a plate 31 provided with opposite rolled edges 32 tightly engaged with shanks 23 for holding shanks 23 in lateral spaced relation as well as preventing movement of plate 31 longitudinally of shanks 23. Plate 31 is provided with an upwardly turned triangular extension 33 and adjacent the base thereof, plate 31 is provided with a transversely extending slot 34 and between slot 34 and the forward end of plate 31, same is provided with an opening 35 which as shown is circular but may be of other configuration. The forward end of plate 31 is provided with an upwardly turned extension 36 terminating in a spear head 37 adapted to pass through a slit 38 in the forward end of a flexible tail piece 39 which extends through the guide slot 34. The tail piece or streamer 39 may be constructed of chamois or other flexible material.

It will be seen from the foregoing disclosure that the device is relatively simple in construction embodying practically only two detachable unitary parts, namely, the body 10 and the hook assembly 21. In assembling the device, plate 24 is placed against the rear end of slot 13, eye member 18 is then passed inwardly through aperture 25 in plate 24, and pin 17 inserted in bores 16, and through eye member 18. The tongue members 26 and 27 are bent down into engagement with body 10 and secured thereto by screws 28, tail piece 39 having previously been secured to the hook assembly 21 by passing the forward end thereof through slot 34 and engaging arrow head 37 with slit 38.

In operation a trolling line is fastened to eye member 12 by means of which the device is drawn through the water to a depth governed mainly by the weight of the device and due to the inclination of the trolling line to the surface of the water there will be a component of the pull exerted through the line tending to elevate the forward end of the body. The shanks of the hook and plate extension 33, offer a slight resistance which results in an undulatory motion, causing the hook assembly to rock on its pivot 17 and also imparting a rocking movement to the body as it is pulled through the water, thus simulating lifelike movements.

In Fig. 7 is illustrated a modification of the invention in which the hook assembly 21' may be connected with body 10 as set forth in connection with the first form of the invention or in any other desirable manner. In this form of the invention the hook assembly 21' has integrally connected with the shanks 23 thereof a bracing and tail supporting member which comprises a transversely extending bar 42 and an arched connecting member 45, between which a tail member 43 of a flexible body cover 44 extends. Body cover 44 comprises a plurality of tentacles 46 which project upon opposite sides of the body and due to their extreme flexibility have imparted thereto a quivering motion as the body is drawn through the water thus giving the bait the appearance of a living moving object.

While eye member 18 is disclosed in Figs. 2 and 3 as being completely closed and integrally uniting the meeting ends of shanks 23, as illustrated in Fig. 8 the pair of hooks 22 may be constructed from a single strand of material having the meeting ends of shanks 23 looped in open eye formation as indicated at 47 for reception of pin 17.

Fig. 9 shows a modification of the hook assembly in which the plate member 31' conforms to and is braced by the inner curved sides of the hooks. In this as in the form shown in Figs. 1, 2 and 3, the flexible trailing or bacon strip is fastened to the prong 36 and threaded through the guiding slot 34.

In Figs. 11 and 12, I have shown the prong 36' and slot guiding member for holding the trailing strip, formed by a wire bent as shown and soldered or otherwise secured to the hook shank.

I claim:—

1. An artificial bait comprising a body member; a vertically disposed slot in said body member; and a combined hook assembly and tail piece pivotally mounted to move in a vertical plane within said slot.

2. The construction defined in claim 1 in which said slot is partially defined by outwardly diverging walls and in which said hook assembly comprises outwardly diverging shanks parallel with said walls.

3. The construction defined in claim 1 in which said pivotal connection comprises a pin loosely inserted in laterally disposed bores in said body member; and a plate provided with a pair of tongue members enclosing said slot; and a second pair of tongue members adapted to retain said pin in said bores.

4. In an artificial bait a hook assembly comprising a pair of angularly disposed shanks; means for retaining and guiding a flexible tail piece or streamer secured to said shanks, and provided with a tail receiving slot and a tail attaching member adjacent one end thereof.

5. The structure defined in claim 4 in which said retaining means is provided with an upwardly turned extension at the rear end thereof.

6. An artificial bait comprising a body member; a vertically disposed slot in one end of said body member; said slot defined by parallel laterally spaced walls adjacent the inner end thereof merging into outwardly diverging walls; and a hook assembly mounted to move in a vertical plane in said slot; said hook assembly comprising an eye member adapted for disposition between said parallel walls and outwardly diverging shanks adapted for disposition between said outwardly diverging walls.

7. The construction defined in claim 6 in which said body member is provided with transversely alined bores opposite said parallel walls; a pin loosely disposed in said bores and said eye member; and a plate provided with an aperture for reception of said shanks and a pair of tongue members adapted to close said slot and a second pair of tongue members adapted to retain said pin in position.

8. An artificial bait comprising a body member; a slot in one end of said body member; a hook provided with an eye disposed in said slot; said body provided with transversely alined bores opening into said slot; a pin loosely disposed in said bores and extended through said eye; and combined reinforcing slot closing, and pin retaining means detachably secured to said body member.

9. The structure defined in claim 8 in which said means comprises a sheet metal plate embodying a central portion for disposition over the slotted end of said body, and two pairs of right angularly disposed tongue members; one pair of said tongue members adapted to close the upper and lower ends of said slot; and the other pair of said tongue members adapted to close the opposite ends of said bores.

10. An artificial bait comprising a body member; a pair of hooks pivotally connected to said body member; a plate adapted to hold said hooks in spaced relation; and a tail piece detachably connected with said plate.

11. An artificial bait comprising a body member; hooks connected to said body member; a spacing member connected to said hooks; a flexible body cover provided with tentacles disposed over said body member; said body cover provided with an integral tail piece extended through said spacing member.

In testimony whereof I affix my signature.

UZ C. PEMBERTON.